2,836,873

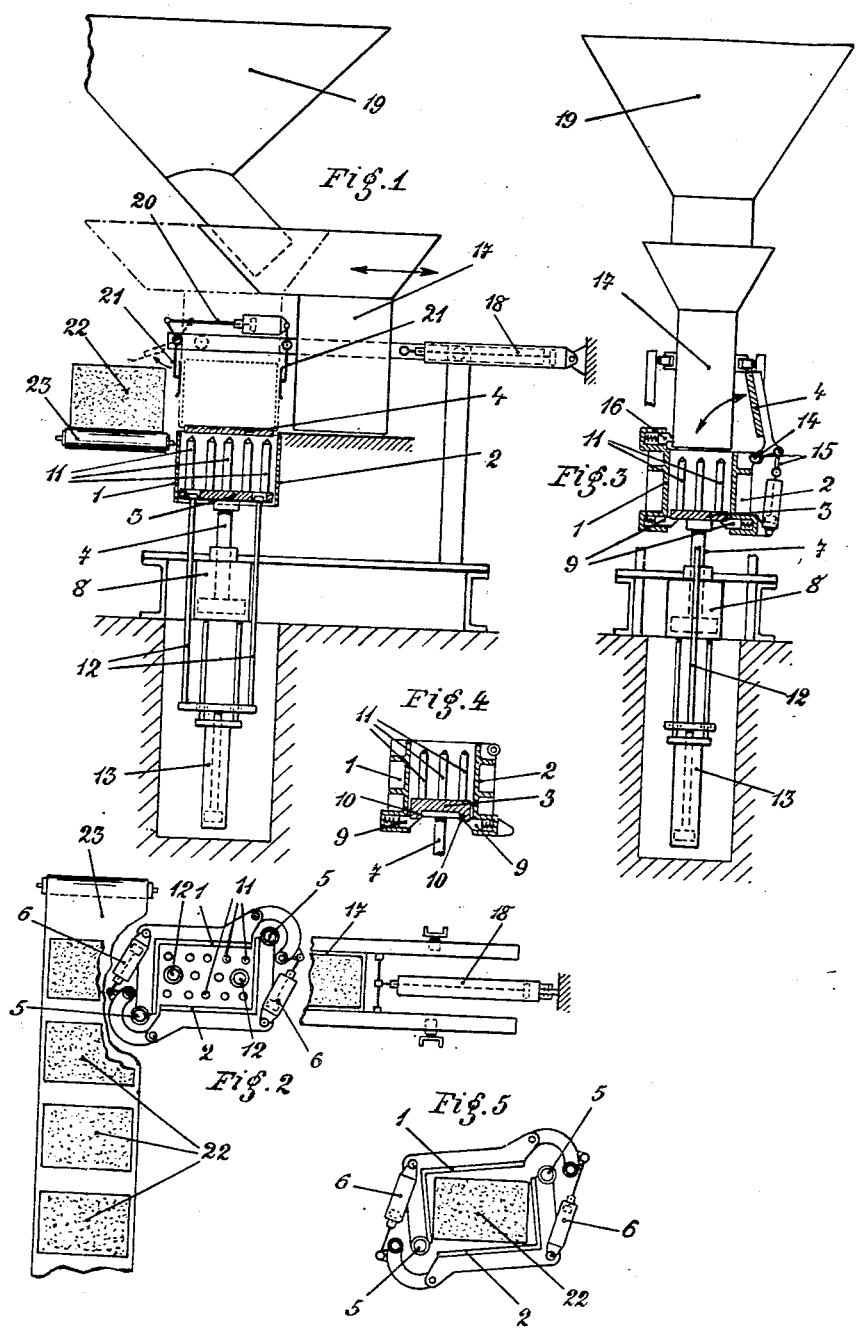

AUTOMATIC PRESS FOR THE PRESSING OF LARGE-SIZED STONES FROM GRANULAR MATERIAL

Hans Lingl, Neu-Ulm, Germany

Application August 11, 1955, Serial No. 527,791

4 Claims. (Cl. 25—45)

The present invention relates to the manufacture of building material, and is particularly directed to an automatic press for the production of large-sized bodies of a required shape from granular raw material, such as coarse sand intermixed with small stones or granular artificial material and a small percentage of cement.

Presses for the manufacture of large-sized shaped bodies of this kind are already known to the art. Most of these known presses use high pressures and employ rigid molds, whereby the cover and bottom of the mold, or a portion of them, are moved in order to achieve the pressing. Other known presses employ inflating means within the molds, whereby the expulsion of the pressed bodies from the walls of the mold is facilitated by the use of slime. Presses of this type are suited for the manufacture of pressed bodies of considerable strength, which for bodies of this kind is usually wanted and also needed for the expulsion of the bodies from the mold.

Other pressing devices provided with removable mold-walls are usually operated by hand. Their producing capacity is, therefore, a small one and unsuited for mass-production.

The invention discloses an automatic press for the manufacture of large-sized pressed bodies, and has for one of its objects to provide means contributing to a very economic and efficacious manufacture of shaped bodies of this type in a fully automatic way, at relatively small pressure, and from moistened material which in granulated form is capable of rolling or slipping, and which yields bodies of coarsely porous texture offering considerable resistance to the passage of heat.

Additional features and advantages of the invention will be understood from a consideration of the following detailed description taken in connection with the accompanying drawings, forming a part of this specification and in which an embodiment of the invention has been shown by way of example. However, I wish to say that the invention is not confined to any strict conformity with the showing of the drawings, but may be changed or modified, so long as such changes or modifications mark no material departure from the salient features of the invention as expressed in the appending claims.

In the drawings, in which like parts are referred to by the same reference numerals in all of the several figures, Fig. 1 is a side-view, partly in section, of the automatic press;

Fig. 2 is a top-view of the press, portions of the feeding means and of the conveying means having been broken away to show the mold;

Fig. 3 is a front-view, partly in section, of the press;

Fig. 4 is a sectional view of a modified form of construction of the mold;

Fig. 5 is a top-view of the mold in opened-up condition.

Referring now to the drawings in greater detail, the mold consists of the two mold-halves 1 and 2, each of which forming a right angle, and of the bottom 3 and the cover 4. All of these parts are movable with respect to each other. The two mold-halves 1 and 2 are rotatable about the diagonally opposed and vertically extending joint-rods 5 serving as bearing supports (see Fig. 2) with the aid of cylinder enclosed piston rods 6 actuable by means of compressed air and simultaneously serving as locking means. In this way the mold-halves rise at a comparatively steep angle from the pressed body, so that the latter may be profiled on its surfaces (see Fig. 5). It will be noted that the mold halves, in their rotation about their respective bearing supports, will move simultaneously in substantially horizontal clockwise and counter-clockwise directions, between the open and closed mold positions, respectively.

The bottom 3 is mounted on the piston rod 7 (see Figs. 1, 3, 4). After the mold has been filled, the bottom is closed-up again through comparatively slight pressure exerted by the cylinder 8 with the aid of compressed air or the like, and secured in closing position by means of the locking members 9 (see Fig. 3) arranged in the mold-halves 1 and 2. In this way is achieved a pre-compression of the material to be pressed. For the control of the pre-compression pressure, the bottom 3 may be provided on its lower side with spacing members 10 (see Fig. 4) positioned in the path of the locking members 9.

Fastened on the bottom 3 in suitable number are the inflating members 11 (perforated tubes provided with a stable rubber covering) which, through bores provided in the bottom 3, are in communication with compressed air conduits, which for clearness of illustration have not been shown in the drawing. There further extend into and through the bottom 3 a plurality of lifting or ejecting members 12 which are adapted for actuation by another pressure cylinder 13 positioned underneath the pressure cylinder 8.

The cover 4 is hingedly connected at 14 to one of the mold-halves 1 and 2 (see Fig. 3). It is opened and closed by means of the piston rods 15, and secured in closing position with the aid of the locking members 16.

Arranged above the mold 1, 2 is the filling funnel 17, which is mounted on a carriage actuated for forward and backward movement (see arrows in Fig. 1) by means of the piston rod 18. From the supply hopper 19 the raw material drops into the filling funnel 17.

Positioned above the mold are further two gripper-arms 21 (see Fig. 1) controlled by piston rods 20. The grippers 21 are arranged at the carriage of the filling funnel 17 and grip the pressed body 22 and transfer it to conveying means 23 (conveying belt or the like—see Figs. 1 and 2).

The device operates as follows: (with the mold-halves 1, 2 in closing position; with the bottom 3 likewise in closing position, but lowered to the starting level of the pre-compression; with the cover 4 open; and with the filling funnel or chest 17 filled up with the material to be pressed—grain-size up to 10–15 mm.)

First, the filling chest 17 is moved above the mold 1, 2 and the latter filled-up with the material to be pressed. After that, the filling chest is moved back and the cover closed, whereby the locking means 16 (Fig. 3) drop into locking position. Then, the bottom 3 is forced upward for the pre-compression of the loose material until the locking means 9 move into locking position, whereby simultaneously the size of the body to be pressed is fixed. Then follows, the pressing of the material through inflation administered by air passing through the inflating means 11. After the pressing, the mold-halves 1 and 2 are rotated away from the pressed body (see Fig. 5), while simultaneously the locking means 9, 16 are withdrawn, so that the cover 4 can be opened. After this, the pressed body 22 is lifted by the ejecting members 12 above the mold, while the bottom drops back by gravity to starting position. Next, the body 22 is gripped by the gripper arms 21, which, simultaneously with the forward feeding of the filling chest 17 for the next following filling action, are moving in lateral direction and placing the body 22 upon the conveying belt 23 or the like.

By means of a centrally positioned controlling shaft, driven from a motor, the entire operating steps are controlled in properly timed relation. This operating and electric switching device is not a part of the present invention, and for that reason has not been illustrated in the drawings.

What I claim as new and desire to secure by Letters Patent of the United States is:

1. In a press for the manufacture of molded bodies of solid compressible material; a mold for said bodies comprising a movable bottom and cover, a first mold half having two ends, a first bearing support, said first mold half being rotatably mounted at one end thereof upon said first bearing support, a second mold half having two ends, a second bearing support, said second mold half being rotatably mounted at one end thereof upon said second support, said first and second mold halves having an open, separated position and a closed position in which they conjoin to form the side walls of said mold, a first cylinder connected to said first mold half intermediate said ends thereof, a piston rod in said first cylinder connected to the other end of said second mold half, a second cylinder connected to said second mold half intermediate the ends thereof, and a piston rod in said second cylinder connected to the other end of said first mold half, said bearing supports being positioned at diagonally opposite locations along said mold side walls, whereby said mold halves may be simultaneously rotated about their respective bearing supports between said open and closed positions by the operation of said piston rods, respectively.

2. In a press according to claim 1, said first mold half and said second mold half being arranged for movement to said open and closed positions, respectively, in a substantially horizontal plane, said mold cover being swingable relative to said first and second mold halves to an open and closed position, respectively, means for swingably moving said mold cover and including a third cylinder, and a piston rod displaceable in said third cylinder and pivotally connected to said mold cover, said mold bottom being movable in a plane perpendicular to said mold halves, a fourth cylinder, and a piston rod displaceable in said fourth cylinder and connected with said mold bottom to impart to the latter an up and down movement, respectively, and perpendicular to said mold halves, to open and close said mold.

3. In a press according to claim 2, including ejector means positioned adjacent said fourth cylinder, said mold bottom being provided with openings for the passage of said ejector means therethrough, when said mold cover is swung to said open position, said ejector means being adapted to remove said molded body from said mold bottom upon movement of said first and second mold halves to open position.

4. In a press according to claim 1, said first and second mold halves being mounted upon their respective bearing support for horizontal movement in clockwise and counter-clockwise directions to open and closed positions, respectively.

References Cited in the file of this patent

UNITED STATES PATENTS

| | | |
|---|---|---|
| 1,017,876 | Landis | Feb. 20, 1912 |
| 1,125,837 | Giguere | Jan. 19, 1915 |
| 1,636,102 | Miller | July 19, 1927 |
| 1,809,601 | Porter | June 9, 1931 |
| 1,925,050 | Jagdmann | Aug. 29, 1933 |
| 2,427,044 | Burns | Sept. 9, 1947 |
| 2,512,092 | Dikes | June 20, 1950 |
| 2,585,193 | Vesper | Feb. 12, 1952 |